United States Patent [19]
Lee et al.

[11] Patent Number: 6,127,767
[45] Date of Patent: *Oct. 3, 2000

[54] COMPLEMENTARY ELECTROSTATIC DRIVING APPARATUS FOR MICROACTUATOR WITH PARASITIC CAPACITANCES OFFSET

[75] Inventors: Byung-leul Lee; Yong-soo Oh; Ci-moo Song, all of Sungnam, Rep. of Korea

[73] Assignee: Samsung Electronics Co., Ltd., Suwon, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/959,922

[22] Filed: Oct. 29, 1997

[30] Foreign Application Priority Data

Oct. 31, 1996 [KR] Rep. of Korea ............. 96-51461

[51] Int. Cl.[7] ...................................... H02N 1/00
[52] U.S. Cl. .................... 310/309; 310/40 MM; 73/514.18; 73/514.23
[58] Field of Search ............ 310/309, 40 MM; 333/186, 189; 324/457; 73/514.18, 514.32

[56] References Cited

U.S. PATENT DOCUMENTS

| | | | |
|---|---|---|---|
| 5,428,259 | 6/1995 | Suzuki | 310/309 |
| 5,455,547 | 10/1995 | Lin et al. | 333/186 |
| 5,757,103 | 5/1998 | Lee et al. | 310/309 |

FOREIGN PATENT DOCUMENTS 0 709 653  5/1996  European Pat. Off. .
0 833 127  4/1998  European Pat. Off. .

OTHER PUBLICATIONS

K. Tanaka et al., "A micromachined vibrating gyroscope," *Sensors and Actuators A*, vol. A50, No. 1/02, Aug. 1, 1995, pp. 111–115.

*Primary Examiner*—Clayton Laballe
*Assistant Examiner*—K. I. Tamai
*Attorney, Agent, or Firm*—Burns, Doane, Swecker & Mathis, LLP

[57] ABSTRACT

An electrostatic driving apparatus for a microactuator is provided, in which a parasitic capacitance is offset to improve the performance thereof. According to the complementary electrostatic driving apparatus for the microactuator, in order to prevent an excitation signal from being mixed with a sensing signal via the parasitic path formed of parasitic capacitance according to the structure of the microactuator and vibration characteristics thereof, which cause noise, signals having opposite polarities are applied to activating vibration plates using an inverter such that the activating vibration signals of each plate, which cause noise, are offset, thereby markedly improving the signal-to-noise ratio. Also, the vibration displacement can be easily detected by a circuit which is not integrated with an actuator. In addition, a sensing unit is simplified, reducing the initial costs. Further, when the excitation signals are applied at the both sides of the vibration direction of the suspended vibration plate, only the AC component, i.e., the ω component, of the electrostatic force acts, so that the resonant characteristics can be improved without an offset of the displacement.

8 Claims, 5 Drawing Sheets

COMPLEMENTARY ELECTROSTATIC DRIVING APPARATUS FOR MICROACTUATOR WITH PARASITIC CAPACITANCES OFFSET

BACKGROUND OF THE INVENTION

The present invention relates to an electrostatic driving apparatus for a microactuator, and more particularly, to an electrostatic driving apparatus for a microactuator which is capable of providing the microactuator highly sensitive performance by offsetting parasitic capacitances against each other.

A micromechanical resonating actuator has been an essential element of a highly sensitive sensor for converting potential or kinetic energy. Particularly, a microgyroscope capable of detecting an angular velocity using a resonator as well as a sensor for sensing pressure, acceleration and gas distribution based on a change in the resonant frequency of a resonator having extremely low attenuation has been actively researched.

FIG. 1 is a circuit diagram of an electrostatic driving apparatus for a conventional comb type microactuator. As shown in FIG. 1, the comb-driven type microactuator includes a combed activating vibration plate 1 fixed by a fixing portion 11a, a combed sensing plate 2 fixed by a fixing portion 12a, a combed suspended vibration plate 3 supported by a support beam 3a and a fixing portion 3b, a ground plate 4 grounded by a ground electrode 4a, a sensing unit 6, and a power unit 5. Here, the power unit 5 supplies AC and DC power to the activating vibration plate 1 via the fixing portion 11a.

If power is supplied to the activating vibration plate 1 from the power unit 5, an electrostatic force is generated between the teeth of the combed activating vibration plate 1 and the teeth of the suspended vibration plate 3, so that the suspended vibration plate 3 vibrates at a resonant frequency. Here, the sensing unit 6 senses a change in the capacitance according to a change in the opposite area opposing areas between the teeth of the sensing plate 2 and the teeth of the suspended vibration plate 3, as a voltage.

FIG. 2 is a diagram of an electrostatic driving apparatus a conventional parallel plate type microactuator. As shown in FIG. 2, the parallel plate type microactuator has a sensing plate 12 at the center thereof, and activating vibration plates 11 at both sides of the sensing plate, and a suspended vibration place 13 over the activating vibration plates 11 and the sensing plate 12. Here, in the circuit of the microactuator, a sensing unit 16 is connected to the sensing plate 12. Also, there is a power unit 15 providing AC and DC power.

If the power is supplied to the activating vibration plate 11 from the power unit 15, an electrostatic force is generated between the activating vibration plate 11 and the suspended vibration plate 13, so that the suspended vibration plate 13 vibrates up and down at a resonant frequency. Here, the sensing unit 16 senses a change in the capacitance according to a change in distance between the sensing plate 12 and the suspended vibration plate 13, as a voltage.

The vibration characteristics of the above electrostatic driven microactuator can be understood easily using an optical unit such as a laser interferometer. However, a simple circuit capable of detecting a change in the capacitance according to the vibration is necessary to apply the vibration characteristics to a sensor. However, since the vibration displacement of a resonator is very small, a change in a signal according to a change in the capacitance to be sensed is very small, so that it is difficult for the vibration characteristics to be applied to sense the change in the signal. To solve this problem, generally, the actuator and a sensing circuit are integrated or the displacement is sensed by a complicated signal processing method. However, there is a limitation to improvement of the signal-to-noise ratio, and the initial costs are high due to an additional required device. Thus, it is necessary to develop a simple sensing device of an off-chip type or an open-loop type.

As shown in FIG. 3, which is section view of FIG. 1, when intending to sense the displacement of a moving resonator 3 (vibration plate) while resonating a vibration plate formed on a silicon substrate, parasitic capacitance 10 and 17 exists between the activating vibration plate 1 generating a vibration signal and the sensing plate 2 detecting a sensing signal, forming a path for transmitting signals through a substrate 14 and each electrode as shown in FIG. 3. Such path for transmitting noise signals acts as a path for transferring noise, so that the activation vibration signal is transferred to the sensing unit via the parasitic path, and the vibration signal is mixed with the sensing signal. Here, resistor R repersents an equivalent resistance in a substrate. Due to such parasitic capacitance, the activating vibration signal mixed with the sensing signal acts as a noise source which lowers the sensitivity in the detection of a sensing signal.

The noise problems due to parasitic capacitance will be described in detail with reference to FIG. 3.

Generally, the activating vibration signal for applying an electrostatic force on an electrostatic type actuator includes both DC and AC components. Here, the amplitude of the applied electrostatic force is proportional to the square of the applied signal, so that the following formulas are obtained.

$$V_D(t) = V_{dc} + V_{ac}\cos\omega t$$

$$F_e(t) \propto V_{dc}^2 + \frac{V_{ac}^2}{2} + 2V_{dc}V_{ac}\cos\omega t + \frac{V_{ac}^2}{2}\cos 2\omega t$$

That is, the electrostatic force generated when applying an activating vibration signal to the actuator includes DC components, and frequency components of $\omega$ and $2\omega$. Thus, if a voltage $V_D(t)$ is applied to the actuator having low attenuation, a displacement of which frequency includes the $\omega$ component and amplitude is proportional to the product of DC and AC components. Here, the electrostatic capacitance to be sensed is as follows.

$C(t)=C_0$ for no resonance $C(t)=C_0+\Delta C(t)$ for resonance $\Delta C(t)=|C_m|\sin\omega_r t$ Here, $C_0$ represents the total electrostatic capacitance of a sensing unit in a stopped state, $|C_m|$ represents the change in the electrostatic capacitance, that is, amplitude, and $\omega_r$ represents the original vibration frequency of the vibration type actuator. Here, the output activating vibration signal, as noise, is transferred via the path for the parasitic capacitance of FIG. 3, so that the activating vibration signal is proportional to the AC component $V_{ac}$, and then presents itself at a sensed output. Thus, in general, a high $V_{dc}$, and a low $V_{ac}$ are applied, if possible, in order to increase the signal-to-noise ratio.

However, it is impossible to lower $V_{ac}$, limitlessly in actual circumstances. Also, even though the level of $V_{ac}$ is lowered to a predetermined level, a considerable noise component which is proportional to $V_{ac}$ exists. Also, as $V_{dc}$ increases, the position of the vibration plate is shifted to one side from the center, by the DC component. As a result, the vibration characteristics of the vibration plate is changed, so that it is difficult to measure the resonant frequency.

According to the conventional electrostatic type microactuator, a parasitic capacitance exists between a port for applying an activating vibration signal to generate electrostatic force, and a port for sensing the change of capacitance, so that the activating vibration signal is transferred to the sensing port as noise. Thus, a signal generated by only the real displacement of the suspended vibration plate cannot be sensed precisely.

SUMMARY OF THE INVENTION

To solve the above problems, it is an object of the present invention to provide an electrostatic driving apparatus for a microactuator, having a new structure capable of markedly improving the signal-to-noise ratio and vibration characteristics.

According to an aspect of the object of the present invention, there is provided an electrostatic driving apparatus for a comb type microactuator, comprising: a suspended vibration plate having a combed portion at both sides thereof; an activating vibration plate having a combed portion engaged with one side of the combed portion of the suspended vibration plate; a sensing plate having a combed portion engaged with the other side of the combed portion of the suspended vibration plate; a sensing unit for sensing the displacement of the suspended vibration plate by a capacitance between the suspended vibration plate and the sensing plate, wherein the capacitance is sensed as a voltage; and a power unit for applying an electrostatic force to the activating vibration plate to excite the suspended vibration plate, wherein the activating vibration plate is divided into two combed portions to form a first activating vibration plate and a second activating vibration plate, and the power unit comprises an inverter and a power source which is directly connected to the first activating vibration plate and connected to the second activating vibration plate via the inverter.

According to another aspect of the object, there is provided an electrostatic driving apparatus for a comb type microactuator, comprising: a suspended vibration plate having two combed portions at each side thereof; an activating vibration plate having a combed portion engaged with one combed portion of the suspended vibration plate; a sensing plate having a combed portion engaged with the other combed portion of the suspended vibration plate; a sensing unit for sensing displacement of the suspended vibration plate by a capacitance between the suspended vibration plate and the sensing plate, wherein the capacitance is sensed as a voltage; and a power unit for applying an electrostatic force to the activating vibration plate to activate the suspended vibration plate, wherein the activating vibration plates correspond to fixed plates located in the center of each side of the suspended vibration plate, and the sensing plate correspond to the fixed plates located at the sides of the suspended vibration plate, wherein all fixed plates are fixed, having separated combed portion engaged with the combed portion of either side of the suspended vibration plate, wherein the power unit comprises an inverter and a power source which is directly connected to one of the middle fixed plates and connected via the inverter to the other middle fixed plate.

Preferably, the power source of the power unit comprises an AC component and first and second DC components, wherein the AC component and first DC component are connected to the one middle fixed plate in series, and AC component is connected to the other middle fixed plate via the inverter and the second DC component is directly connected to the other middle fixed plate. Also, preferably, the sensing unit further comprises a differential amplifier having one input port connected to one pair of side fixed plates by shortening each other, and the other input port connected to the other of side fixed plates by shortening each other.

According to still another aspect of the object, there is provided an electrostatic driving apparatus for a parallel plate type microactuator, comprising: first and second activating vibration plates formed on a planar substrate being separated each other; a sensing plate formed on the substrate, between the first and second activating vibration plates; a parallel suspended vibration plate formed parallel to the substrate and separated in the upper direction by a predetermined distance, over the first and second activating vibration plates and the sensing plate; a sensing unit for sensing a displacement of the parallel suspended vibration plate by a change in the capacitance according to the distance between the parallel suspended vibration plate and the sensing plate, wherein the change in capacitance is sensed as a voltage; and a power unit for applying an electrostatic force to the first and second activating vibration plates to activate the parallel suspended vibration plate, wherein the power unit comprises an inverter and a power source which is directly connected to the first activating vibration plate and and connected to the second activating vibration plate via the inverter.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Figure 1:
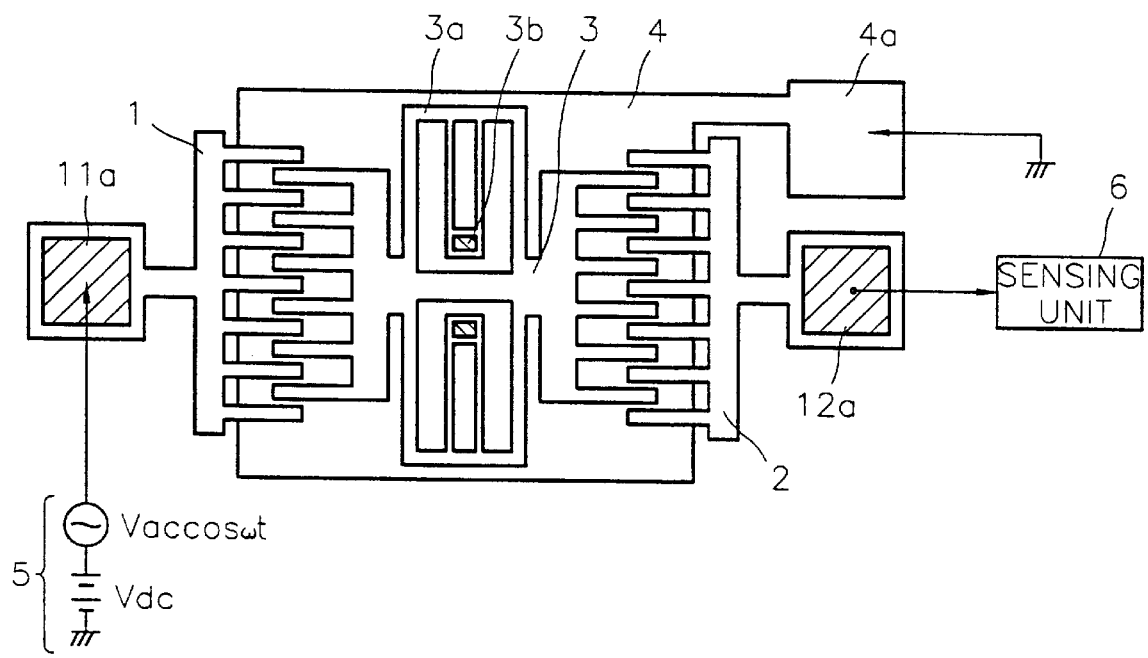
FIG. 1 is a diagram of an electrostatic driving apparatus for a conventional comb type microactuator.
Figure 4:
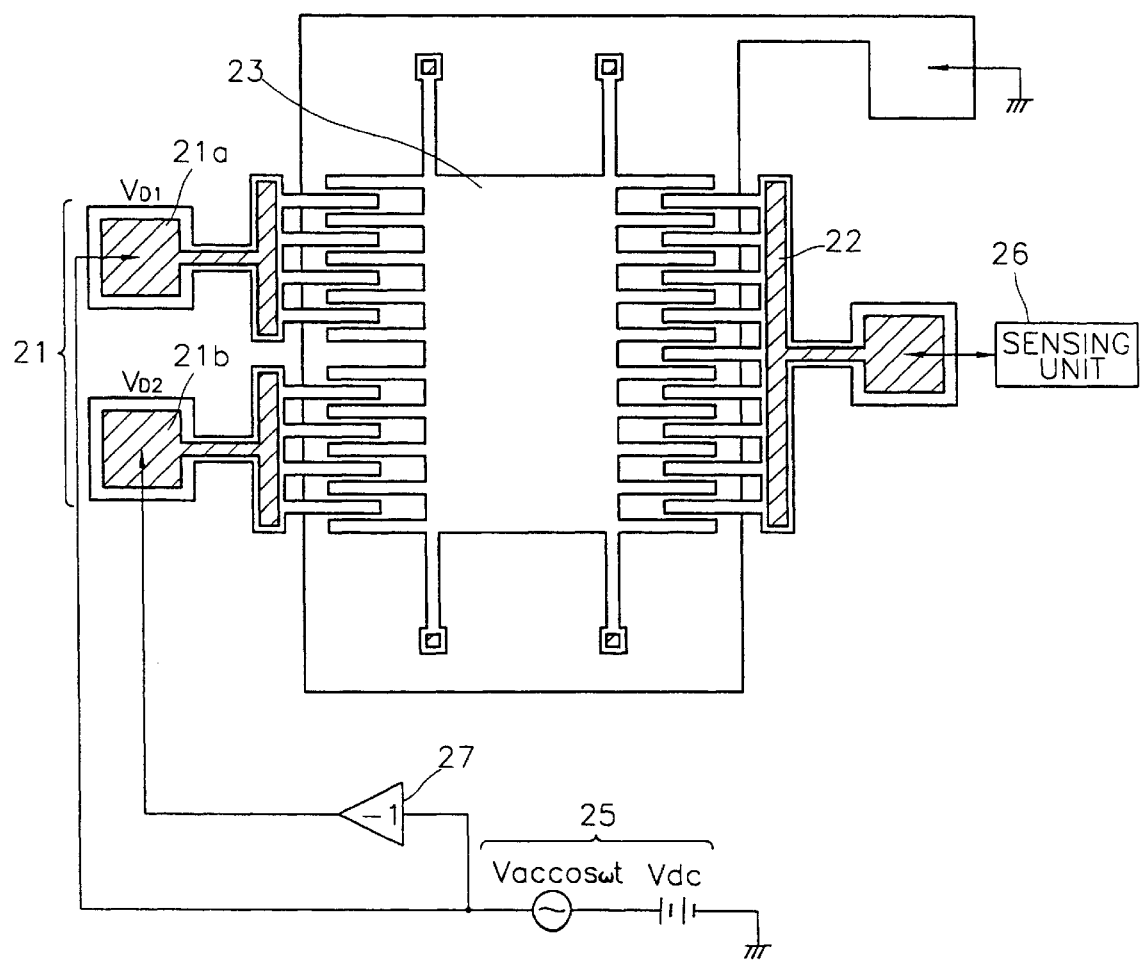
FIG. 4 is a diagram of a complementary electrostatic driving apparatus for a comb-driven type microactuator according to a preferred embodiment of the present invention.

FIG. 4 shows a complementary electrostatic driving apparatus for a comb type microactuator according to a preferred embodiment of the present invention, which includes separated activating vibration plates and a power unit having an inverter, in order to solve the problems of the comb type microactuator shown in FIG. 1. Based on the fact that the electrostatic force is proportional to the square of an applied signal and the noise component is proportional to the applied signal, unlike the electrostatic driving apparatus of FIG. 1, the activating vibration plate is divided to form first and second activating vibration plates 21a and 21b to generate equal electrostatic forces but opposing noise signals, such that the AC component acting as noise in a sensing unit 26 due to the parasitic capacitance is offset. That is, the second activating vibration plate 21b of two comb is connected to an inverter 27, so that the signal of the power unit 25 is inversely applied to the second activating vibration plate 21b. Here, electrostatic force generated at each combed portion is equal to each other in amplitude and has the same polarity, but the transferred noise signals are out of phase with respect to each other. Thus, the signal-to-noise ratio is markedly improved.

$$V_{D1}(t) = V_{dc} + V_{ac} \cos \omega t$$

$$V_{D2}(t) = -V_{dc} - V_{ac} \cos \omega t$$

$$F_{e1}(t) = F_{e2}(t), \quad V_{N1}(t) = -V_{N2}(t)$$

where $F_{e1}(t)$ represents the electrostatic force due to $V_{D1}$, $F_{e2}(t)$ represents electrostatic force due to $V_{D2}$, $V_{N1}(t)$ represents the noise signal of $V_{D1}$, and $V_{N2}$ represents the noise signal of $V_{D2}$.

Figure 2:
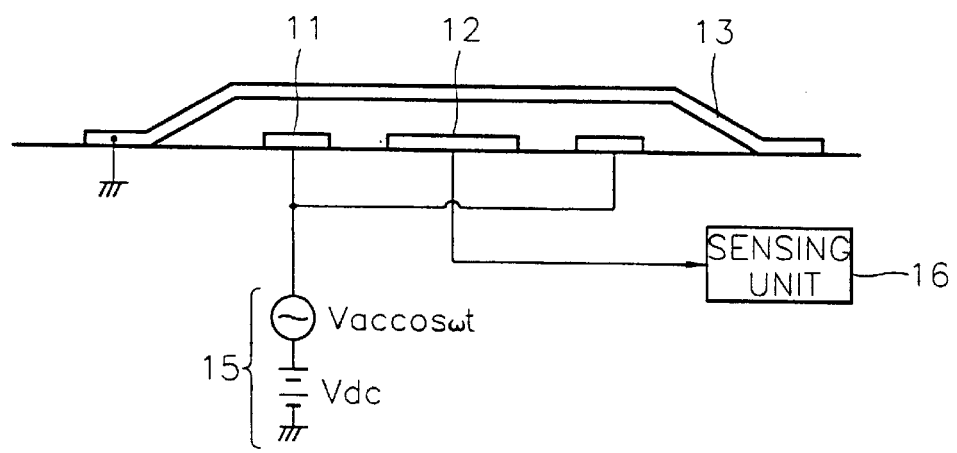
FIG. 2 is a diagram of an electrostatic driving apparatus for a conventional parallel plate type microactuator.
Figure 3:
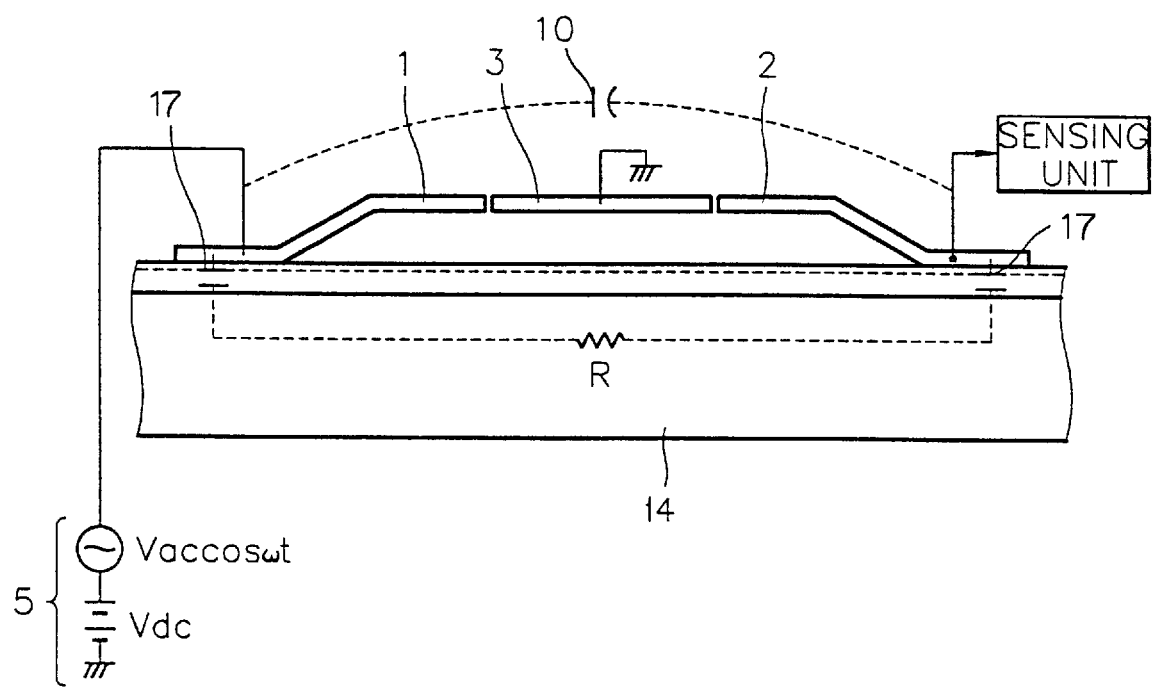
FIG. 3 is a diagram showing the distribution of the parasitic capacitance in the conventional comb type microactuator of FIG. 1.
Figure 5:
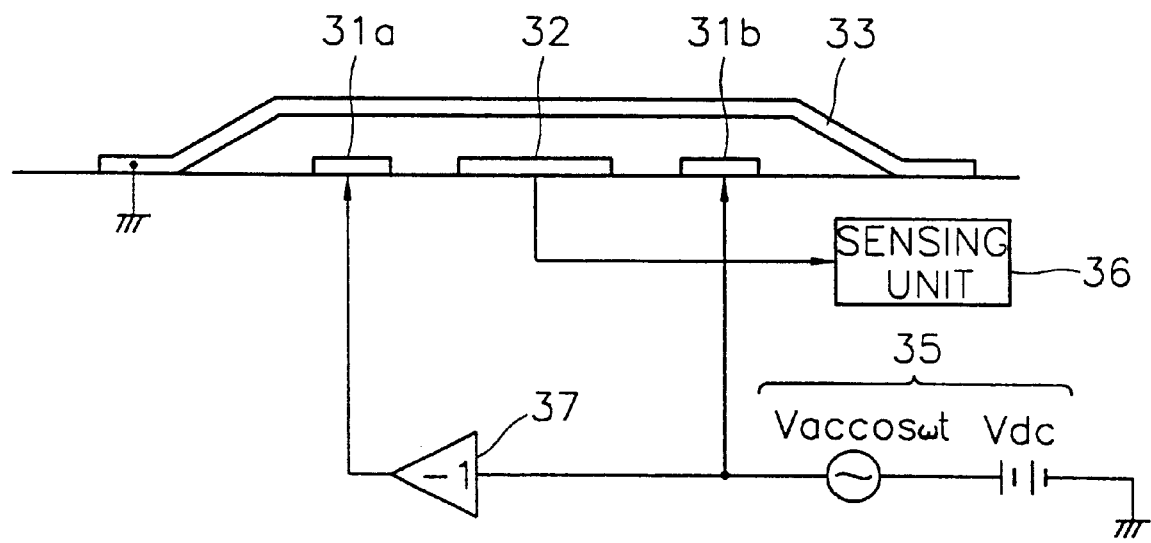
FIG. 5 is a diagram of a complementary electrostatic driving apparatus for a parallel plate type microactuator according to another preferred embodiment of the present invention.

FIG. 5 is a diagram showing a complementary electrostatic driving apparatus for a parallel plate type microactuator according to anther embodiment of the present invention, which is obtained by applying the complementary electrostatic driving apparatus as shown in FIG. 4 to the conventional parallel plate type microactuator as shown in FIG. 2. That is, a first activating vibration plate 31a is connected to an inverter 37 such that the signal of a power unit 35 is inversely applied thereto, and the signal of the power unit 35 is applied to a second activating vibration plate 31b without inversion. As a result, the same characteristics and effect as those of the complementary electrostatic driving apparatus for the comb type microactuator shown in FIG. 4 can be obtained.

Figure 6:
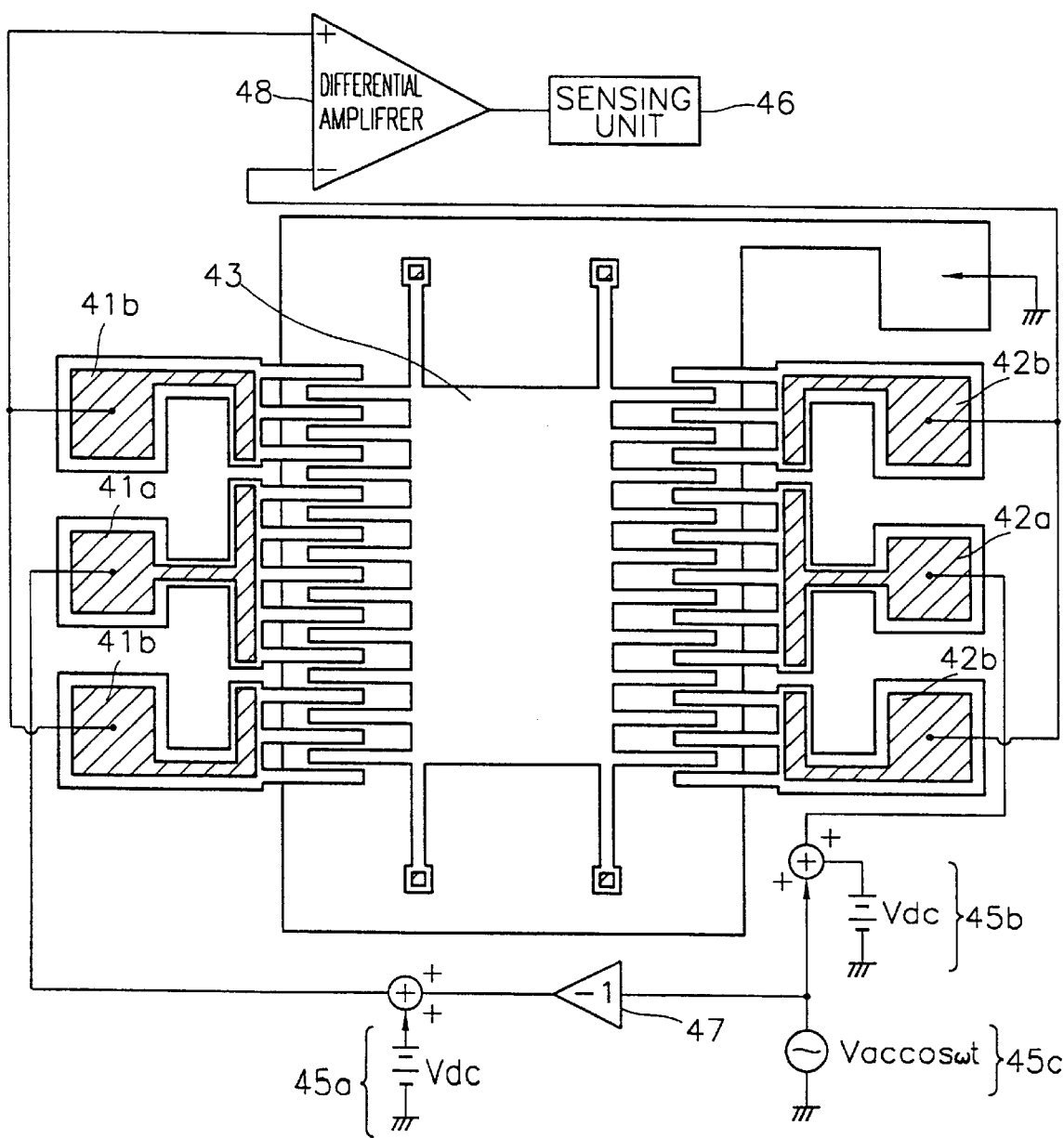
FIG. 6 is a diagram of a complementary electrostatic driving apparatus for a comb type microactuator having improved vibration characteristics, according to still another embodiment of the present invention.

FIG. 6 is a circuit diagram of a complementary electrostatic driving apparatus for a comb type microactuator having improved vibration characteristics according to still another embodiment of the present invention. As shown in FIG. 6, the vibration characteristics of the actuator are improved using the complementary electrostatic driving apparatus. In order to form such complementary electrostatic driving apparatus, first and second fixed plates 41a, 41b, 42a and 42b having combed portions that are engaged with the combed portions at either side of a suspended vibration plate 43 while being separated by three groups are fixed. The fixed plates 41a and 42a at the center act as first and second activating vibration plates, and the pair of plates 41b and 42b at the sides act as sensing plates. Also, an equal driving voltage is applied to the first and second activating vibration plates 41a and 42a, and there is a phase difference of 180° in the AC component. That is, there are two DC components 45a and 45b, and an AC component 45c. Here, two DC components 45a and 45b are directly applied to the first and second activating vibration plates 41a and 42a, respectively. However, AC component 45a is inversely applied to the first activating vibration plate 41a via an inverter 47 connected to the first activating vibration plate 41a, and is directly applied to the second activating vibration plate 42a without inversion. As a result, the activating vibration signal which acts as a noise by the parasitic capacitance can be compensated for by the AC excitation signals having opposite polarities. Also, electrostatic forces respectively generated by the DC and 2ω components in the first and second activating vibration plates 41a and 42a are equal, to compensate for each other. In addition, electrostatic forces generated by a pure ω component in two plates are different by as much as 2 times, so that a vibrator (suspended vibration plate 43) starts to operate in a state without the initial displacement, thereby improving the vibration characteristics by resonance. Also, the sensing unit 46 is connected to sensing plates 41b and 42b which are separated into two at each side, via a differential amplifier 48, to receive an amplified differential compenent of each output signal of the sensing plates 41b and 42b. As a result, a large signal due to a displacement of a vibration plate 43 can be easily detected.

As described above, in the complementary electrostatic driving apparatus for a microactuator according to the present invention, in order to prevent the activating vibration signal from being mixed with the sensing signal via the parasitic path formed of parasitic capacitance according to the structure of the microactuator and vibration characteristics thereof, which cause noise, signals having opposite polarities are applied to the activating vibration plates using an inverter such that the activating vibration signals of each plate, which cause noise, are offset, thereby markedly improving the signal-to-noise ratio. Also, the vibration displacement can be easily detected by a circuit which is not integrated with an actuator. In addition, the sensing unit is simplied, reducing the initial costs. Further, when the activating vibration signals are applied at the both side of the vibration direction of the suspended vibration plate, only the AC component, i.e., the ω component, of the electrostatic force acts, so that the resonant characteristics can be improved without an offset of the displacement.

What is claimed is:

1. An electrostatic driving apparatus for a comb type microactuator, comprising:

a suspended vibration plate having a combed portion at both sides thereof;

a first activating vibration plate and a second activating vibration plate each having a combed portion engaged with one and the same side of the combed portion of the suspended vibration plate;

a sensing plate having a combed portion engaged with the other side of the combed portion of the suspended vibration plate;

a sensing unit for sensing the displacement of the suspended vibration plate by a capacitance between the suspended vibration plate and the sensing plate; and a power unit for applying an electrostatic force to the activating vibration plate to excite the suspended vibration plate, wherein the power unit comprises an inverter and a power source which is directly connected to the first activating vibration plate and connected to the second activating vibration plate via the inverter.

2. An electrostatic driving apparatus as claimed in claim 1, wherein the power source comprises an AC component and a DC component connected in series.

3. An electrostatic driving apparatus for a comb type microactuator, comprising:

a suspended vibration plate having two combed portions at each side thereof;

an activating vibration plate having a combed portion engaged with combed portions of the suspended vibration plate;

a sensing plate having a combed portion engaged with combed portions of the suspended vibration plate;

a sensing unit for sensing displacement of the suspended vibration plate by a capacitance between the suspended vibration plate and the sensing plate; and a power unit for applying an electrostatic force to the activating vibration plate to activate the suspended vibration plate, wherein the activating vibration plate is divided into two combed fixed plates located centrally at each side of the suspended vibration plate, and the sensing plate is divided into two combed fixed plates located at the sides of the suspended vibration plate, wherein all fixed plates are fixed, having separated combed portion engaged with the combed portion of either side of the suspended vibration plate, wherein the power unit comprises an inverter and a power source which is directly connected to one of the fixed plates of the activating vibration plate and connected via the inverter to the other one of the fixed plates of the activating vibration plate.

4. An electrostatic driving apparatus as claimed in claim 3, wherein the power source of the power unit comprises an AC component and first and second DC components, wherein the AC component and first DC component are connected in series to one of the fixed plates of the activating vibration plate, and AC component is connected to the other one of the fixed plates of the activating vibration plate via the inverter and the second DC component is directly connected to the other one of the fixed plates of the activating vibration plate.

5. An electrostatic driving apparatus as claimed in claim 4, wherein the sensing unit further comprises a differential amplifier having one input port connected to one pair of said fixed plates of said sensing plate, and the other input port connected to the other of said fixed plates of said sensing plate.

6. An electrostatic driving apparatus as claimed in claim 3, wherein the sensing unit further comprises a differential amplifier having one input port connected to one pair of said fixed plates by shortening each other, and the other input port connected to the other of said fixed plates by shortening each other.

7. An electrostatic driving apparatus for a parallel plate type microactuator, comprising:

first and second activating vibration plates formed on a planar substrate, said first and second activating vibration plates being separated from each other;

a sensing plate formed on the substrate interposed the first and second activating vibration plates;

a parallel suspended vibration plate formed parallel to the substrate and separated from a surface of said substrate by a predetermined distance and over the first and second activating vibration plates and the sensing plate;

a sensing unit for sensing a displacement of the parallel suspended vibration plate by a change in the capacitance according to the distance between the parallel suspended vibration plate and the sensing plate; and a power unit for applying an electrostatic force to the first and second activating vibration plates to activate the parallel suspended vibration plate, wherein the power unit comprises an inverter and a power source which is directly connected to the first activating vibration plate and connected to the second activating vibration plate via the inverter.

8. An electrostatic driving apparatus as claimed in claim 7, wherein the power source comprises AC and DC components connected in series.

* * * * *